J. W. DENMEAD.
FRICTION CLUTCH.
APPLICATION FILED JAN. 18, 1911.

999,016.

Patented July 25, 1911.
2 SHEETS—SHEET 1.

Witnesses:
Austin B. Hauscom
G. L. McClintock

INVENTOR-
John W. Denmead
BY C. E. Humphrey
ATTORNEY.

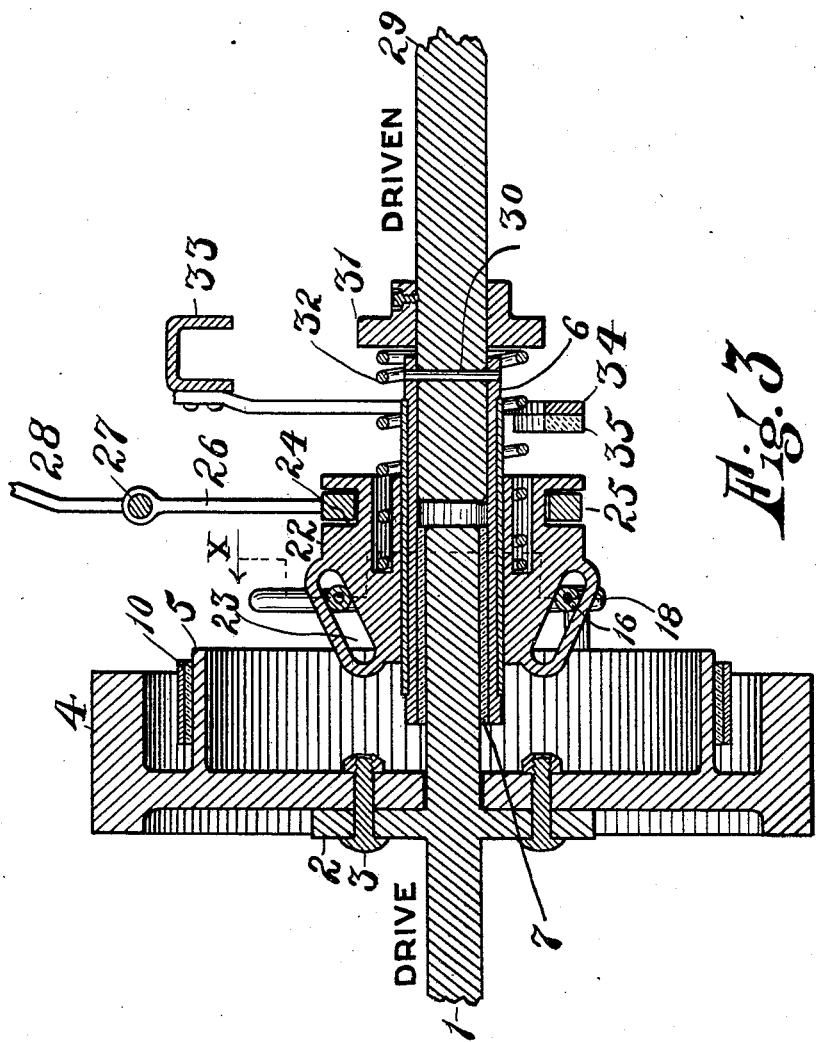

UNITED STATES PATENT OFFICE.

JOHN W. DENMEAD, OF AKRON, OHIO, ASSIGNOR OF ONE-HALF TO JAMES CHRISTY, OF AKRON, OHIO.

FRICTION-CLUTCH.

999,016. Specification of Letters Patent. Patented July 25, 1911.

Application filed January 18, 1911. Serial No. 603,395.

*To all whom it may concern:*

Be it known that I, JOHN W. DENMEAD, a citizen of the United States, residing at Akron, in the county of Summit and State of Ohio, have invented new and useful Improvements in Friction-Clutches, of which the following is a specification.

This invention has relation to improvements in friction clutches adapted to be employed wherever a device of this nature is required and especially is intended for use on self-propelled vehicles.

The object of the invention, broadly speaking, is to provide a device by which motion is transmitted from a driving to a driven shaft by the employment of one or more contractible bands, carried by one member and engaging a suitable seat therefor on the companion member, the said device further embodying means tending to constantly throw the members into clutching relation.

The invention further consists in providing the mechanism which effects clutching relation between the two members, with auxiliary means the function of which is to increase rather than decrease the clutching engagement between the two members in proportion to the speed of revolution of the shafts, the effectiveness of said auxiliary means being increased rather than decreased by the centrifugal force developed during the revolution of the clutch, as contra-distinguished from others in which the development of centrifugal force due to the revolution of the device tends to detach the clutch members from clutching engagement with each other.

The invention also contemplates automatically establishing clutching relation between the members, the termination of which will be entirely within the control of the operator and will require a voluntary effort on his part.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

Figure 2:
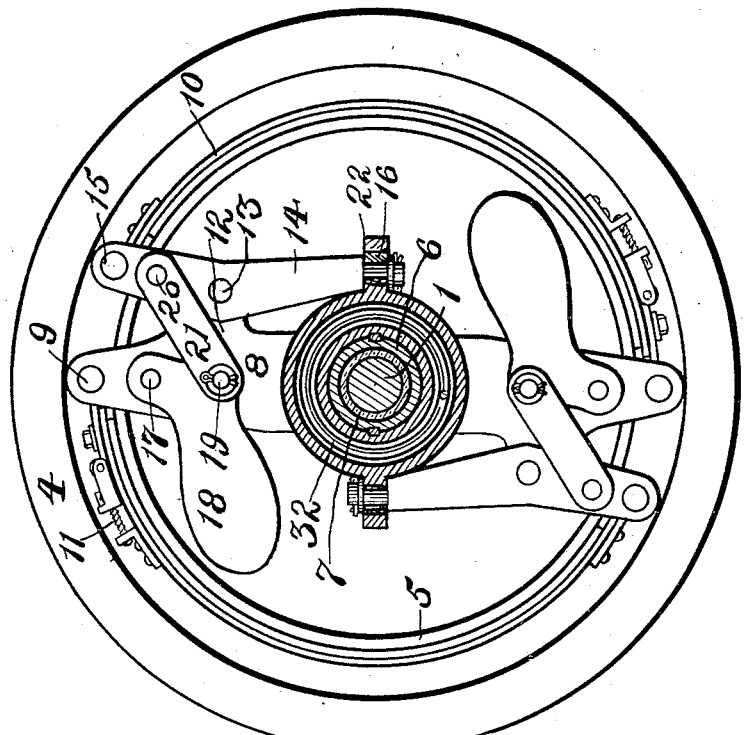
Figure 1:
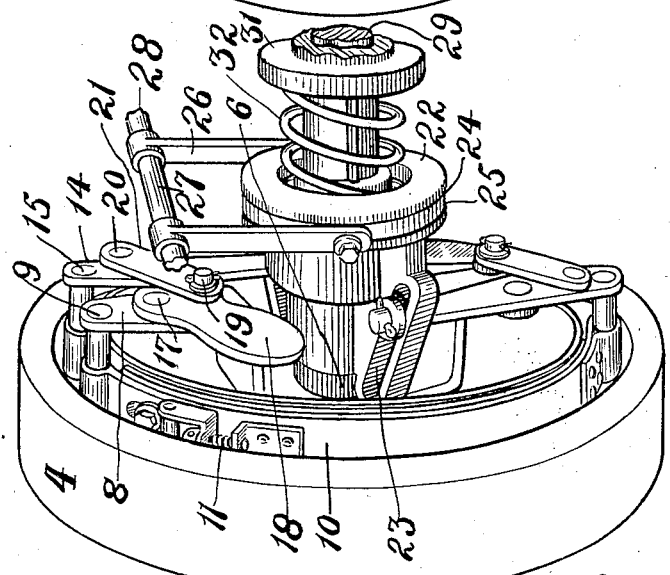

In the drawings in which similar reference numerals indicate like parts in the different figures, Figure 1, is a perspective view of a device embodying this invention. Fig. 2, is a transverse sectional view of a friction clutch embodying this invention approximately on line X of Fig. 3; and, Fig. 3, is a longitudinal central sectional view of the device shown in Fig. 1.

Referring to the drawings in detail the reference numeral 1 denotes a driving shaft arranged to be rotated for the purpose of this application continuously, by some power-generating instrumentality. This shaft is provided with preferably an integral, circumferential-flange 2, having a plurality of apertures therein to receive hold-fast devices such as bolts 3. Mounted on the shaft 1 and secured to the flange 2 through the medium of the bolts 3 is the male member of the clutch embodying a balance wheel 4 having projecting from one face thereof a circumferential-flange 5, preferably formed integral with the wheel 4, the outer face of which constitutes a seat arranged to be engaged by the clutch mechanism of the companion or female member of this clutch.

Inclosing the free end of the shaft 1 is a sleeve 6 provided interiorly with a friction-reducing bushing 7 which receives the end of the shaft 1 and constitutes a bearing therefor. The end of the sleeve 6 which is adjacent to the balance wheel 4 is provided with a pair of oppositely disposed radial and preferably integral-arms 8. In the outer ends of these arms are apertures to receive pins 9 held parallel with the shaft 1 and arranged to extend over the outer surface of the flange 5 and constitute anchorages for the fixed ends of semi-circumferentially-formed clutch-bands 10, which are preferably provided with longitudinal adjusting-means such as bolts 11. On the lateral face of each of the arms 8 and near the outer-ends thereof are apertured-ears 12 which serve to support pins 13 constituting pivots for clutch levers 14 which are movable thereon. The outer ends of the clutch-levers 14 are provided with pins 15 to receive the movable-ends of the clutch-bands 10.

The inner-ends of the clutch-levers 14 terminate on opposite sides of the sleeve 6 and slightly removed therefrom. The inner ends of these levers are provided with friction-reducing rollers 16 for a purpose to be later described.

Mounted in the arms 8 are pins 17 constituting pivots for a pair of weights 18 the ends of which are provided with T-shaped heads, each provided at one side with an aperture to receive one of the pins 17 and at the opposite side with a pin 19. The clutch levers 14 are provided with projecting pins 20 positioned between the outer free-ends thereof and the apertures which receive the pins 13. The pins 19 are connected with the pins 20 by means of links 21. The arrangement of the mechanism just described being such that as the body portions of the weights 18 are driven outwardly due to the centrifugal force developed by the rapid rotation of the clutch they will have the tendency to draw the outer free ends of the clutch-levers 14 toward the pins 9 thereby contracting the clutch-bands. The clutch-bands are in each case extended from their respective anchorage pins 9 around the outer-face of the flange 5 to the pins 13 on the movable clutch levers 14 thereby forming semi-circumferential clamping-bands for engaging the outer face of the flange 5.

Mounted on the outer face of the sleeve 6 and longitudinally shiftable thereon is a clutch-lever-operating-sleeve 22, which is splined to the sleeve 6 so as to revolve in unison therewith while freely shiftable longitudinally thereon. On opposite sides of and near that end of this sleeve 22 which is adjacent to the arms 8, is formed a pair of inwardly-inclined-slots 23 of sufficient width to receive the rollers 16 on the inner ends of the clutch-levers 14, and as the sleeve 22 is shifted longitudinally, the rollers 16 traveling in the inclined slots will be drawn inwardly toward the sleeve 6 and forced outwardly therefrom, causing the rocking of the clutch-levers 14 on the pins 13 thereby moving their outer-ends which carry the free-ends of the clutch-bands 10 to produce or release clutching engagement between the latter and the flange 5. The end of the sleeve 22 opposite to that which is provided with the slots 23 is formed with a circumferential groove 24 to receive a loose-ring 25 to which is attached on opposite sides thereof shifter-arms 26 carried by a rock-shaft 27 suitably supported, the movement of which is produced by means of an arm 28 secured thereto, so that when the rock-shaft 27 is rotated by the operator it will, through the hereinbefore described mechanism, draw the sleeve 22 away from the balance-wheel 4 and cause the inner-ends of the clutch-levers 14 to move inwardly thereby releasing the clutch-bands 10 from clutching engagement with the flange 5. The sleeve 22 is provided with an annular space or counter-bored opening surrounding the sleeve 6.

The driven shaft 29 to which any mechanism to be driven by the shaft 1, may be connected, extends into the outer open-end of the sleeve 6 and is secured thereto by some means, such as a pin 30. Mounted on the driven shaft 29, adjacent to the end of the sleeve 6 is some device such as a collar 31 constituting an abutment and I prefer when necessary to make this longitudinally adjustable on said shaft whereby the space between it and the sleeve 22 may be regulated or changed at will. Mounted on the sleeve 6 between the sleeve 22 and the collar 31 is a coiled-spring 32, the normal tendency of which is to force the shiftable-sleeve 22 inwardly toward the balance-wheel 4. This spring need not necessarily be of great strength or stiffness but it should have sufficient force to readily shift the sleeve 22 inwardly with enough pressure to cause the clutch-bands to engage the flange 5, but experience has thoroughly demonstrated that the spring should not be so stiff as to require undue effort on the part of the operator to overcome it when releasing the clutch.

Secured to some suitable support such as a transversely-extending channel-iron 33 extending above the sleeve 6, is a U-shaped member 34 surrounding but spaced from the sleeve 6. This member is arranged to constitute a stop for limiting the outward-movement of the sleeve 22 when moved in a position to terminate clutching relation between the members of the clutch. And to cause this member 34 to perform the function of a brake, one of the faces thereof is provided with a strip 35 of some wear-resisting material as vulcanized fiber, so that when the sleeve 22 is shifted rearwardly and is still rotating due to the momentum of the mechanism with which it is connected its frictional engagement with the vulcanized-fiber on the U-shaped member will arrest a protracted rotation of the same.

The operation of the device is thought to be clear from the foregoing description, but assuming that the driving shaft is rotating and it is desired to communicate motion to the driven shaft, the operator will release the arm 28 permitting the coiled spring 32 to force the sleeve 22 inwardly toward the balance wheel 4, in doing which the inner ends of the clutch levers 14 will be thrown outwardly, causing a reverse movement of their outer ends tending to contract the bands 10 on the outer face of the flange 5, inducing clutching-relation between the two members of the device and as this is produced by the resilient action of the spring 32 the rotation of the driven shaft 28 will be easily accomplished without jerks or unnecessary abruptness. As the driven-member commences to rotate in unison with the driving member the centrifugal force produced by the rotation will cause the weights 18 to swing outwardly on their pivots 17 causing them through the mechanism before described to still further contract the bands 10 and as the amount of centrifugal force developed is proportionate to the speed of revolution it naturally follows that the greater the speed, the greater the degree of effectiveness of the clutching relations between the members is increased.

I claim:

1. A friction clutch embodying a driving member provided with a seat, a driven shaft, a sleeve fixedly mounted thereon, an arm carried by said sleeve, a circumferential-band surrounding said seat and connected with said arm, a rocking-lever suitably supported and connected with the loose end of said band, means engaging the free end of said lever and mounted on said sleeve arranged when moved in one direction to rock said lever to tighten said band, and a weight moved by the centrifugal force developed by the revolution of said clutch arranged to assist in contracting said band, in direct ratio to the amount of centrifugal force developed, for effecting clutching relation between said band and seat.

2. A friction clutch embodying a driving member provided with a seat, a driven shaft, a sleeve secured to the latter, a radial arm carried by said sleeve, a contractible-band surrounding said seat, the fixed end of which is anchored to said arm, a suitably supported rocking-lever connected with the free end of said band, a member mounted for longitudinal movement on said sleeve and provided with means for rocking said lever to contract said band on said seat, and a spring for normally moving said member to a position to establish clutching relation between said band and seat.

3. A friction clutch embodying a driving member provided with a seat, a driven shaft, a sleeve secured to the latter, a radial arm carried by said sleeve, a contractible-band surrounding said seat the fixed end of which is anchored to said arm, a suitably supported rocking-lever connected with the free end of said band, a member mounted for longitudinal movement on said sleeve and provided with means for rocking said lever to contract said band, a spring for normally moving said member to a position establishing clutching relation between said band and seat, and an arm adapted to shift said member to move said band to its inoperative position.

4. A friction clutch embodying a driving member provided with a seat, a driven member comprising a contractible circumferentially formed band adapted to frictionally engage said seat, a rocking-lever to contract said band and a longitudinally shiftable sleeve provided with an inclined slot to receive the end of said rocking-lever for oscillating said lever to contract said band.

5. A friction clutch embodying a driving member provided with a seat, a driven member embodying a contractible band adapted to frictionally engage said seat, means for anchoring one end of said band, a rocking-lever connected with the opposite end of said band for contracting the same and a longitudinally shiftable sleeve provided with an inclined slot to receive the opposite end of said rocking-lever and adapted when shifted to oscillate said lever for contracting or releasing said band.

6. A friction clutch embodying a driving member provided with a seat, a driven member embodying a pair of semi-circumferential contractible bands adapted when contracted to frictionally engage said seat to insure clutching relation between the members of the clutch, fixed anchorages for the ends of said bands, a pair of rocking-levers connected to the opposite ends of said bands, and a longitudinally shiftable member provided with a pair of slots oblique to the axis of said clutch and adapted to receive the opposite ends of said rocking-levers and arranged when shifted to oscillate said levers to contract or release said bands.

7. A friction clutch embodying a driving and a driven member one of which is provided with an annular seat, shafts supporting said members, a circumferentially-arranged band adapted to frictionally engage said seat, an anchorage for one end of said band, a rocking-lever suitably supported and connected with the opposite end of said band, means shiftable longitudinally of said shaft and engaging the free end of said lever arranged when moved to oscillate the latter to contract or expand said band.

8. A friction clutch embodying a driving and a driven member one of which is provided with an annular seat, shafts supporting said members, a circumferentially-arranged band adapted to frictionally engage said seat, an anchorage for one end of said band, a rocking-lever suitably supported and connected with the opposite end of said band, means shiftable longitudinally of said shafts arranged when moved to oscillate said lever to contract or expand said band, and a weight connected with said band and moved by the centrifugal force developed by the movement of said clutch adapted to assist in increasing the clutching engagement between said band and seat in direct ratio to the amount of centrifugal force developed.

9. A friction clutch embodying a driving and a driven member one of which is provided with an annular seat, shafts supporting said members, a contractible and expansible band arranged to frictionally engage said seat, an anchorage for one end of said band, a rocking-lever suitably supported and connected with the opposite end of said band, means shiftable longitudinally of said shafts and provided with an inclined slot receiving the free end of said lever and arranged when moved to oscillate the latter to contract or expand said band.

10. A friction clutch embodying a driving and a driven member one of which is provided with an annular seat, shafts supporting said members, a contractible and expansible band arranged to frictionally engage said seat, an anchorage for one end of said band, a rocking-lever suitably supported and connected with the opposite end of said band, means shiftable longitudinally of said shafts and provided with an inclined slot receiving the free end of said lever and arranged when moved to oscillate the latter to contract or expand said band, and a weight connected with said band and moved by the centrifugal force developed by the revolution of said clutch adapted to assist in increasing the clutching engagement between said band and seat in direct ratio to the amount of centrifugal force developed.

11. A friction clutch embodying a driving and a driven member one of which is provided with an annular seat, shafts supporting said members, a contractible and expansible band arranged to frictionally engage said seat, an anchorage for one end of said band, a rocking-lever suitably supported and connected with the opposite end of said band, means shiftable longitudinally of said shafts and engaging the free end of said lever arranged when moved to oscillate the latter to contract or expand said band, and a spring tending to move the last named means into a position to induce clutching relation between said band and seat.

12. A friction clutch embodying a driving and a driven member one of which is provided with an annular seat, shafts supporting said members, a contractible and expansible band arranged to frictionally engage said seat, an anchorage for one end of said band, a rocking-lever suitably supported and connected with the opposite end of said band, means shiftable longitudinally of said shafts and engaging the free end of said lever arranged when moved to oscillate the latter to contract or expand said band, and a spring tending to move the last named means into a position to induce clutching relation between said band and seat, and a weight connected with said band and moved by the centrifugal force developed by the movement of said clutch adapted to assist in increasing the clutching engagement between said band and seat in direct ratio to the centrifugal force developed.

In testimony whereof I have hereunto set my hand in presence of two subscribing witnesses.

JOHN W. DENMEAD.

Witnesses:
C. E. HUMPHREY,
A. L. McCLINTOCK.

---

Copies of this patent may be obtained for five cents each, by addressing the "Commissioner of Patents, Washington, D. C."